United States Patent [19]

Felder

[11] Patent Number: 4,656,564
[45] Date of Patent: Apr. 7, 1987

[54] BICYCLE HANDLEBAR LIGHT

[76] Inventor: Willie L. Felder, 2644 Chicago Ave. S., Apt. 105, Minneapolis, Minn. 55407

[21] Appl. No.: 841,569

[22] Filed: Mar. 20, 1986

[51] Int. Cl.[4] ............................................. F21V 33/00
[52] U.S. Cl. ....................................... 362/72; 340/134
[58] Field of Search ................. 362/72, 191, 194, 205, 362/61; 340/134

[56] References Cited

U.S. PATENT DOCUMENTS

| 2,513,071 | 6/1950 | Wendt | 362/194 |
| 2,793,284 | 5/1957 | Simoneit | 340/87 |

FOREIGN PATENT DOCUMENTS

| 1275595 | 10/1961 | France | 362/72 |
| 405118 | 2/1934 | United Kingdom | 362/72 |
| 583570 | 12/1946 | United Kingdom | 340/134 |
| 834060 | 5/1960 | United Kingdom | 362/72 |

Primary Examiner—Charles J. Myhre
Assistant Examiner—D. M. Cox
Attorney, Agent, or Firm—James V. Harmon

[57] ABSTRACT

A light is provided for improving bicycle safety. It is adapted to be mounted entirely within openings at the rear of each bicycle handlebar. A bulb holder is provided with an annular bead at its rear end and forwardly extending resilient, radially expandable handlebar engaging retaining members in contact with the inside surface of the handlebar and surrounding a light bulb mounted within it. A transparent cover sheet is supported on the bead and extends across the rear of the light bulb in a position when mounted to be aligned close to the rear end of the handlebar. A bulb supporting member, e.g., a tube, extends forwardly from the bead to hold the light bulb in place and a bulb socket encloses the base of the bulb. The bulb holder includes an outlet for the wire supplying current to the bulb which is led through the opening around the rear end of the handlebar then forwardly along its outside surface.

5 Claims, 6 Drawing Figures

BICYCLE HANDLEBAR LIGHT

FIELD OF THE INVENTION

The present invention relates to vehicle lighting and more particularly to handlebar lighting for bicycles and motorcycles to improve safety in operation.

BACKGROUND OF THE INVENTION

The recent increase in popularity in the last few years of bicycle racing has resulted in a much greater use of racing style bicycles particularly by the general public, and while the invention is suited for use with any bicycle, it is particularly useful with racing style bicycles in which handlebars are wrapped with tape.

Lighting systems previously proposed for use on bicycle handlebars are generally unsuitable in connection with bicycles having taped handlebars not only because they require the use of handlegrips which are undesirable but also because they are in the way or interrupt the clean lines of the handlebar. In addition, prior devices are not suitable for mounting directly on a handlebar and usually project rearwardly from the handlebar somewhat. Early attempts to produce satisfactory handlebar lighting are exemplified by U.S. Pat. Nos. 2,469,944; 2,603,701 and 2,793,284, 4,319,307. In all of these prior devices, a light bulb is mounted on the handlegrip to project rearwardly a short distance from the end of the handlebar and a lens enclosing the bulb is supported upon a rearward extension of the handlegrip. These patents demonstrate attempts to solve the problem of providing effective lighting for bicycle handlebars. All of these patents, although making significant contributions to the field, still require handlegrips for support or otherwise interfere with the uniform contours of the cloth wrap provided over the handlebars and tend to be in the way, a fact which is important for racing style bicycles.

In view of these and other deficiencies of the prior art, it is an object of the invention to provide improved handlebar lighting which is supported entirely from the handlebar itself, requiring no handlegrip for support and is recessed almost entirely within the handlebar.

Another object of the invention is to provide handlebar lighting which will not interfere with the uniform contours of the tape wrapped about the outside surface of the handlebar.

Another object is to provide vehicle lighting which will enable existing high-speed or racing bicycles which have no handlegrips to be retrofitted with the lights and wherein wiring will be protected but will not require the drilling of holes or the like in the handlebars.

Still another object of the invention is to provide an improved handlebar light which can be easily installed by a bicycle owner who is unskilled in electrical wiring, with provision for recessing the entire light within the rearward end of the handlebar and supporting the light by engagement of outwardly projecting resilient inwardly deflectable and extendable bar engaging members surrounding the bulb and projecting outwardly in a radial direction around it.

SUMMARY OF THE INVENTION

The objectives of this invention are accomplished by the provision of a bulb holder having an annular bead at its rear end and a resilient radially expandable handlebar engaging retaining member secured to the bead at its rear end and extending forwardly inside the handlebar so as to surround the bulb. A transparent cover sheet is supported by the bead and extends across the rear end of the bulb holder in a position when mounted to be close to alignment with the end of the handlebar. A bulb supporting means extends forwardly from the bulb holder bead to support the bulb therewithin. A bulb socket is mounted on the unit to enclose the base of the bulb. Thus, both the bulb holder and the bulb are substantially totally surrounded and enclosed by the handlebar. An electrical conductor preferably extends from the bulb through the bead radially and projects forwardly on the outside surface of the handlebar between the handlebar and convolutions of tape that are wrapped over it.

THE DRAWINGS

DESCRIPTION OF THE PREFERRED EMBODIMENT

Figure 1:
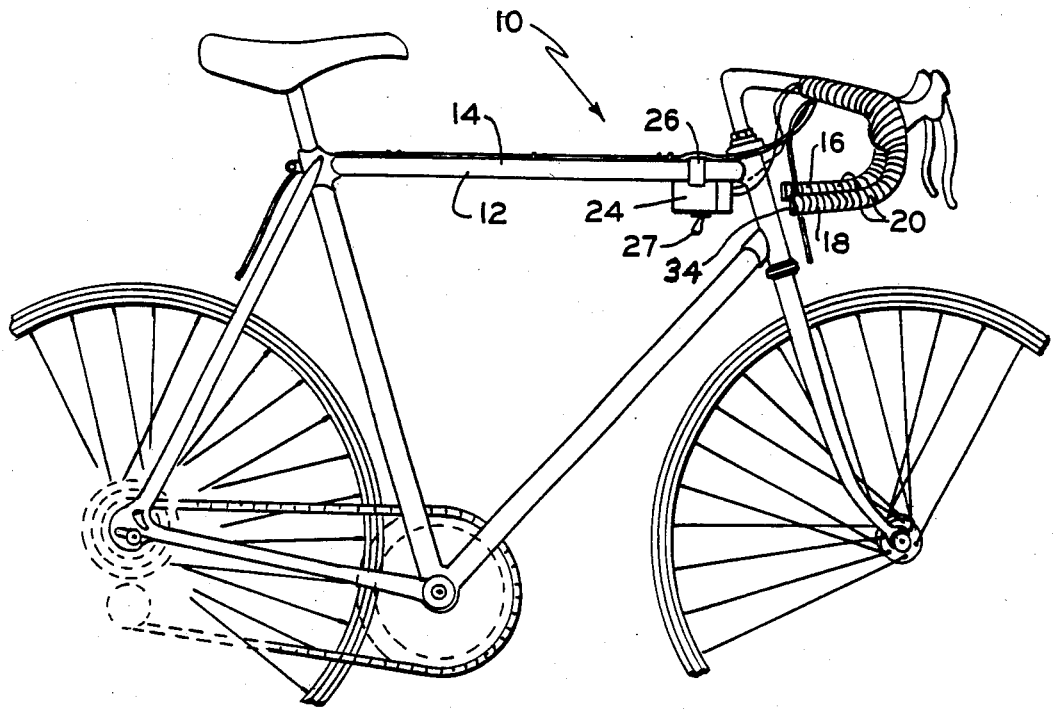
FIG. 1 is a side elevational view of a bicycle upon which the invention is mounted.
Figure 2:
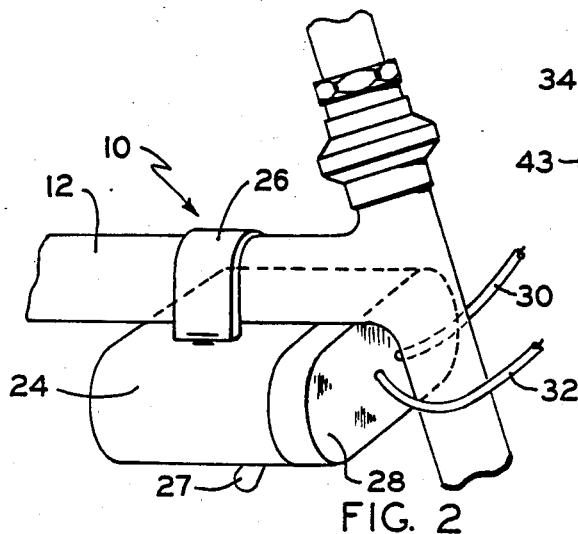
FIG. 2 is a perspective view of the front portion of the bicycle frame partially broken away.

Shown in FIG. 1 is a racing style bicycle 10 having framework 12 including an upper bar 14, handlebars 16 and 18 each covered by wraps of cloth tape 20. The wraps of tape 20 extend all the way to the free end 22 of each handlebar to provide secure hand grip for the user. A battery pack 24 is secured to the frame member 12 by means of a retaining clip 26. The battery pack 24 can, however, be mounted on any suitable frame member of the bicycle 10 or even, if desired, on the handlebars 16, 18. Battery pack 24 is provided with an on and off switch 27 and may, if desired, be provided with a flashing circuit 28 to flash the lights on and off if desired. The battery pack can be grounded by means of the retaining clip 26 and a pair of conductors 30 and 32 are provided for right and left handlebar lights which will be described below.

Figure 3:
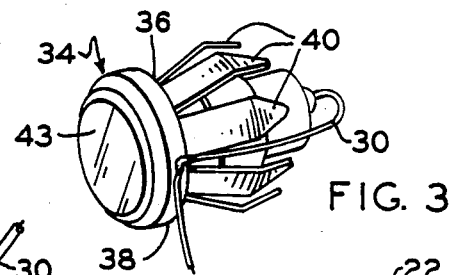
FIG. 3 is a perspective view of the light assembly in accordance with the invention.

The handlebar assembly will now be described with particular reference to FIGS. 3–5. As shown in the figures, the invention provides a handlebar safety light indicated generally by numeral 34 which includes a bulb holder 36, in this case formed from sheet metal and having an annular bead 38 at its rear end. Extending forwardly from the bead 38 as an integral part of the bulb holder are resilient radially expandable handlebar engaging retaining members which in this case comprise fingers 40 that surround an electric light bulb 42. At the rear of the bulb holder 34 and supported by the bead 38 is a transparent cover sheet 43 which extends across the rear end of the light holder 34 in a position when mounted within the handlebar 16, 18, to be aligned close to the rear end 22 of the handlebar. As can be seen, while the cover sheet 43 is not flush with the end of the handlebar 22, it projects only a small fraction of an inch at most and consequently is not likely to be in the way. Cover sheet 43 is preferably colored red, yellow or other suitable color to attract attention.

The bulb is enclosed within the handlebar and the bulb holder 36 is supported solely from the inside surface of the handlebar. Extending forwardly from the bead 38 is a bulb supporting tube 50 preferably formed from plastic. The tube 50 can, as shown in FIG. 5, be integral at its rearward end with the transparent cover sheet 43 or, if desired, bonded to it. The tube 50 is provided with a centrally projecting interior shoulder 52 to engage the bulb 42 and to help hold it in position.

Slidably engaged over the tube 50 and over the base 50a as a separate piece is bulb socket 54 which is flared outwardly at its rear end 54a to form a tight sliding fit over the outside of the tube 50. An insulator 56 provided at the rear of the socket with a contact 58 wired to conductor 30 or 32. It will be seen that the forward ends of the resilient fingers 40 contact socket 54 thereby completing the circuit for the light 42.

Figure 4:
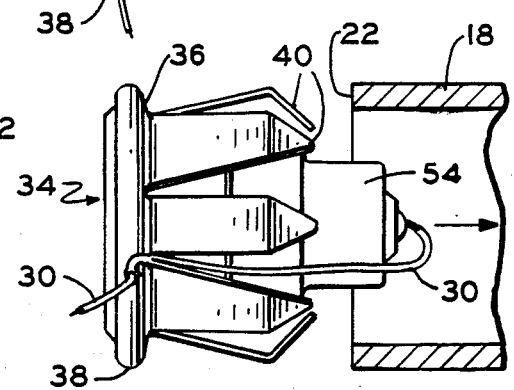
FIG. 4 is a side elevational view of a light in accordance with the invention as it appears just prior to insertion into the handlebar.
Figure 5:
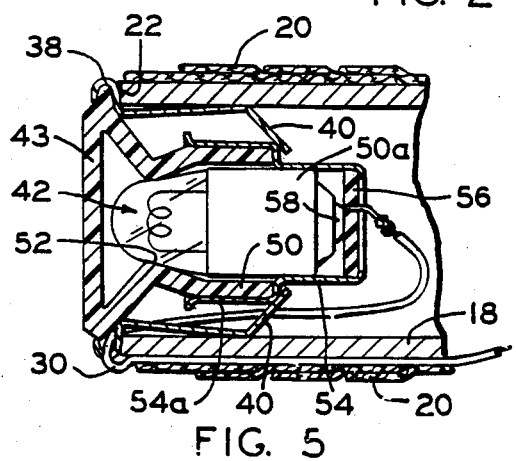
FIG. 5 is a view similar to FIG. 4 after insertion.
Figure 6:
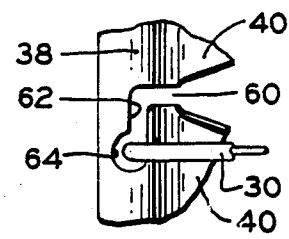
FIG. 6 is an enlarged partial side elevational view of the bead of the bulb holder at the point where the conductor emerges.

As shown in FIGS. 4 and 6, the light holder is provided with a wire guide groove 60 between two of the adjacent fingers 40. The guide groove 60 communicates with a circumferentially extending offset slot 62 in the bead 38. At the other end of the offset slot 62 is a wire outlet opening 64 through which conductor 30 extends. As clearly shown in FIG. 5, the conductor 30 projects forwardly from the opening of 64 and immediately beneath the wraps 20 of cloth tape. In this way, the conductor 30 is protected from displacement or abrasion and is held securely in place. It will also be understood that with conductors 30 and 32 on the outside of the handlebar as shown beneath the tape 20, the handlebar does not have to be drilled so that the conductors can be passed through it. Moreover, the conductors do not have to be fed through the handlebars. This saves time and enables the light to be installed more quickly and efficiently. In addition, the conductor 30 at the point where it passes out of the opening 64 and under the first wrap of tape 20 serves as a retaining means for holding the light in place within the end of the handlebar. Thus, if the light or a portion of the bead 38 is unintentionally jarred, the segment of the conductor adjacent to the first wrap of tape 20 will help hold it in place and prevent it from being inadvertently removed.

Many variations are possible. For example, the resilient and expandable bar engaging means 40 can take a variety of forms. It can consist of plastic material having a high friction outer surface or series of circumferential, outwardly projecting flanges adapted to grip the inside surface of the handlebar. Other gripping means which can be provided on the outside surface of the bulb holder to engage the inside surface of the handlebar will be apparent to those skilled in the art.

From the above description, it will be seen that the handlebar lights do not change the shape, appearance or cloth wrapping of the handlebars. The bulb and its supporting structure are enclosed internally within the bulb holder while at the same time providing a highly effective safety light to help prevent injury and save lives. The unit can be easily installed by a bicycle user following simple instructions as a retrofit unit on existing bicycles. The device is inexpensive and no handle grips are required.

Many variations of the invention within the scope of the appended claims will be apparent to those skilled in the art once the principles disclosed above are understood.

What is claimed is:

1. A light for improving the safety of a bicycle having handlebars including tubular rearwardly projecting handle portions comprising,
   a bulb holder mountable substantially entirely within the tubular handlebar,
   said bulb holder including an annular bead at its rearward end and a handlebar engaging retaining member secured to the annular bead and extending forwardly therefrom inside the handlebar to support the bulb holder within the handlebar and said retaining member surrounding and enclosing a light bulb,
   a transparent cover sheet supported by the bead of the bulb holder and extending across the rearward end of the light holder rearwardly of the bulb in a position when mounted within the handlebar to be aligned close to an open end of the handlebar,
   a bulb supporting member extending forwardly from the annular bead of the bulb holder to enclose and support said bulb therewithin,
   a bulb socket supported on the member to enclose the base of the bulb and said bulb holder having a wire outlet opening through which a wire carrying current to the bulb can be passed out through the bulb holder so as to extend forwardly therefrom along the outside surface of the handlebar.

2. The handlebar light of claim 1 wherein the retaining member comprises resilient, radially expandable outwardly deflectable members secured to the annular bead and engaging the inside surface of the handlebar to provide a frictional force for holding the light within the handlebar.

3. The light of claim 2 wherein the retaining members comprise a plurality of circumferentially distributed forwardly extending fingers connected at their rearward ends to the annular bead and surrounding the light on all sides.

4. The apparatus of claim 1 wherein the bulb supporting means is a tube extending forwardly from a rear portion of the bulb holder within the retaining means and the bulb socket is connected to the tube to surround at least a base portion of the light bulb.

5. The safety light of claim 1 wherein the bulb holder includes a rearwardly extending wire guide groove communicating at its rearward end with a circumferentially extending offset slot in the bead of the bulb holder and said offset slot terminates in said wire outlet opening, whereby a wire extending out of the wire outlet opening can be secured in place by a cloth strip wrapped around the handlebar and the wire will help to retain the bulb holder in place on the handlebar.

* * * * *